(12) United States Patent
Lim

(10) Patent No.: US 10,725,296 B2
(45) Date of Patent: Jul. 28, 2020

(54) HEAD-UP DISPLAY DEVICE, VEHICLE INCLUDING THE SAME, AND METHOD FOR CONTROLLING THE HEAD-UP DISPLAY DEVICE

(71) Applicants: HYUNDAI MOTOR COMPANY, Seoul (KR); KIA MOTORS CORPORATION, Seoul (KR)

(72) Inventor: Won Suk Lim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/189,427

(22) Filed: Nov. 13, 2018

(65) Prior Publication Data

US 2020/0026078 A1 Jan. 23, 2020

(30) Foreign Application Priority Data

Jul. 18, 2018 (KR) .......................... 10-2018-0083422

(51) Int. Cl.
*G02B 27/01* (2006.01)
*B60K 35/00* (2006.01)
*G09G 5/00* (2006.01)
*G02B 27/00* (2006.01)
(Continued)

(52) U.S. Cl.
CPC .......... *G02B 27/0149* (2013.01); *B60K 35/00* (2013.01); *B60R 11/0235* (2013.01); *G02B 27/0093* (2013.01); *G02B 27/0101* (2013.01); *G09G 5/003* (2013.01); *B60K 2370/52* (2019.05); *B60K 2370/80* (2019.05); *B60R 2011/0005* (2013.01); *B60R 2011/0085* (2013.01); *G02B 2027/0138* (2013.01); *G02B 2027/0159* (2013.01); *G09G 2354/00* (2013.01); *G09G 2380/10* (2013.01)

(58) Field of Classification Search
CPC ............ G02B 27/0149; G02B 27/0093; G02B 27/0101; G02B 2027/0138; G02B 2027/0159; B60K 35/00; B60K 2370/80; B60K 2370/52; B60K 2370/1529; B60R 11/0235; B60R 2011/0005; B60R 2011/0085; G09G 5/003; G09G 2354/00; G09G 2380/10
See application file for complete search history.

(56) References Cited

U.S. PATENT DOCUMENTS

| 2006/0007191 | A1* | 1/2006 | Chi | ...................... B62B 3/1424 345/184 |
| 2015/0288857 | A1* | 10/2015 | Fay | ...................... H04N 5/2251 348/36 |
| 2017/0123203 | A1* | 5/2017 | Klabukov | .......... G02B 27/0101 |

FOREIGN PATENT DOCUMENTS

| KR | 10-2018-0024557 A | 3/2018 |
| KR | 10-2018-0040317 A | 4/2018 |

\* cited by examiner

*Primary Examiner* — Stephen G Sherman
(74) *Attorney, Agent, or Firm* — Morgan, Lewis & Bockius LLP

(57) ABSTRACT

A head-up display device includes: a cradle on which an electronic device is placed; a glass in which an image, which is output from the electronic device, is reflected; and a controller that receives a control command of the electronic device and adjusts a tilt of the cradle. Accordingly, even though the position of a driver's eyes is shifted according to the driver's posture change, or a new driver sits in the driver's seat, the head-up display device enables the driver to easily gaze at the head-up display device.

18 Claims, 13 Drawing Sheets

(51) Int. Cl.
*B60R 11/02* (2006.01)
*B60R 11/00* (2006.01)

HEAD-UP DISPLAY DEVICE, VEHICLE INCLUDING THE SAME, AND METHOD FOR CONTROLLING THE HEAD-UP DISPLAY DEVICE

CROSS-REFERENCE TO RELATED APPLICATION

This application is claims the benefit of priority to Korean Patent Application No. 10-2018-0083422, filed in the Korean Intellectual Property Office on Jul. 18, 2018, the entire contents of which are incorporated herein by reference.

TECHNICAL FIELD

The present disclosure relates to a head-up display device, a vehicle including the same, and a method for controlling the head-up display device. More specifically, the present disclosure relates to a head-up display device that adjusts the tilt thereof according to a control command received from an electronic device, a vehicle including the head-up display device, and a method for controlling the head-up display device.

BACKGROUND

In general, a head-up display (HUD) is a device that shows vehicle information (e.g., speed, map, and indicator information) in front of a driver. The HUD improves the driver's attention to the road ahead, assisting in safe driving.

HUDs may be classified into a windshield type HUD and a combiner type HUD according to the forms thereof.

The windshield type HUD displays vehicle information on the window (windshield) at the front of a vehicle. The vehicle information may be displayed like a hologram at distance of about 2 m ahead of a driver. That is, the windshield type HUD displays the vehicle information on the windshield of the vehicle without a separate screen. However, the combiner type HUD displays vehicle information on a separate screen (glass) installed in front of the driver.

Since the windshield type HUD displays an image on the windshield of the vehicle, the position of an HUD screen may be somewhat adjustable according to the level of the driver's eyes. However, a polarizer film has to be included in the windshield to prevent image retention when an image is displayed on the windshield, and therefore a cost competitiveness of the windshield type HUD may be deteriorated. Furthermore, additional cost may be required to secure a package space in the crash pad (C/PAD) in front of the driver's seat.

The combiner type HUD is fixed to a specific position at the top of the crash pad. Therefore, a separate package space is not required, which leads to a reduction in cost. Consequently, the combiner type HUD is easy to apply to a low-priced vehicle. However, the combiner type HUD has problems in that an image can be focused on only a predetermined position and due to a narrow field of view, the driver cannot accurately view a screen even when the screen slightly deviates from the driver's view point.

SUMMARY

The present disclosure has been made to solve the above-mentioned problems occurring in the prior art while advantages achieved by the prior art are maintained intact.

An aspect of the present disclosure provides a head-up display device that includes a cradle on which an electronic device is placed, and controls the cradle according to a control command received from the electronic device, a vehicle including the head-up display device, and a method for controlling the head-up display device.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a head-up display device includes: a cradle on which an electronic device is placed; a glass in which an image, which is output from the electronic device, is reflected; and a controller that receives a control command of the electronic device and adjusts a tilt of the cradle.

The cradle may include a base detachably mounted on an attachment surface of a vehicle, a tilt-adjustable connector coupled to a top of the base, a drive device that adjusts a tilt of the connector, and a support coupled to a top of the connector. A tilt of the support relative to the vehicle may be adjusted by the adjustment of the tilt of the connector.

The control command may include a control command to adjust the tilt of the cradle such that a reflection position of a driver's eyes is formed in a predetermined region of an image taken with a camera of the electronic device.

The predetermined region may be a central portion of the image taken with the camera of the electronic device.

The control command may be generated based on an image of the glass taken with the camera of the electronic device.

The control command may include at least one of a first control command generated when the reflection position of the driver's eyes is formed in the predetermined region of the image taken with the camera of the electronic device, a second control command generated when the reflection position of the driver's eyes is formed above the predetermined region of the image taken with the camera of the electronic device, and a third control command generated when the reflection position of the driver's eyes is formed below the predetermined region of the image taken with the camera of the electronic device.

Upon the receipt of the first control command, the controller may maintain the tilt of the cradle.

Upon the receipt of the second control command, the controller may adjust the tilt of the cradle such that the cradle is slanted in a direction facing away from the driver.

Upon the receipt of the third control command, the controller may adjust the tilt of the cradle such that the cradle is slanted in a direction toward the driver.

The controller may continually receive control commands of the electronic device after receiving the control command of the electronic device and adjusting the tilt of the cradle.

According to another aspect of the present disclosure, a vehicle includes a head-up display device and an electronic device. The head-up display device includes: a cradle on which the electronic device is placed; a glass in which an image, which is output from the electronic device, is reflected; and a controller that receives a control command of the electronic device and adjusts a tilt of the cradle. The electronic device includes a camera that takes an image of the glass of the head-up display device and a controller that determines a reflection position of driver's eyes based on the image of the glass and generates a control command to adjust the tilt of the cradle of the head-up display device.

According to another aspect of the present disclosure, a method for controlling a head-up display device includes: allowing, by a controller, the head-up display device to operate in conjunction with an electronic device; receiving, by the controller, a control command of the electronic device when the head-up display device operates in conjunction with the electronic device, and adjusting, by the controller, a tilt of a cradle on which the electronic device is placed, according to the control command received.

The receiving of the control command may include receiving a control command generated based on an image of a glass of the head-up display device that is taken with a camera of the electronic device.

The receiving of the control command may include receiving a control command to adjust the tilt of the cradle such that a reflection position of driver's eyes is formed in a predetermined region of an image of a glass of the head-up display device that is taken with a camera of the electronic device.

The predetermined region may be a central portion of the image taken with the camera of the electronic device.

The receiving of the control command may include at least one of receiving a first control command generated when a reflection position of a driver's eyes is formed in a predetermined region of an image taken with a camera of the electronic device, receiving a second control command generated when the reflection position of the driver's eyes is formed above the predetermined region of the image taken with the camera of the electronic device, and receiving a third control command generated when the reflection position of the driver's eyes is formed below the predetermined region of the image taken with the camera of the electronic device.

The adjusting of the tilt of the cradle according to the control command received may include maintaining the tilt of the cradle, upon the receipt of the first control command.

The adjusting of the tilt of the cradle according to the control command received may include adjusting the tilt of the cradle such that the cradle is slanted in a direction facing away from the driver, upon the receipt of the second control command.

The adjusting of the tilt of the cradle according to the control command received may include adjusting the tilt of the cradle such that the cradle is slanted in a direction toward the driver, upon the receipt of the third control command.

The method may further include continually receiving control commands to adjust the tilt of the cradle after the adjusting of the tilt of the cradle according to the control command received.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
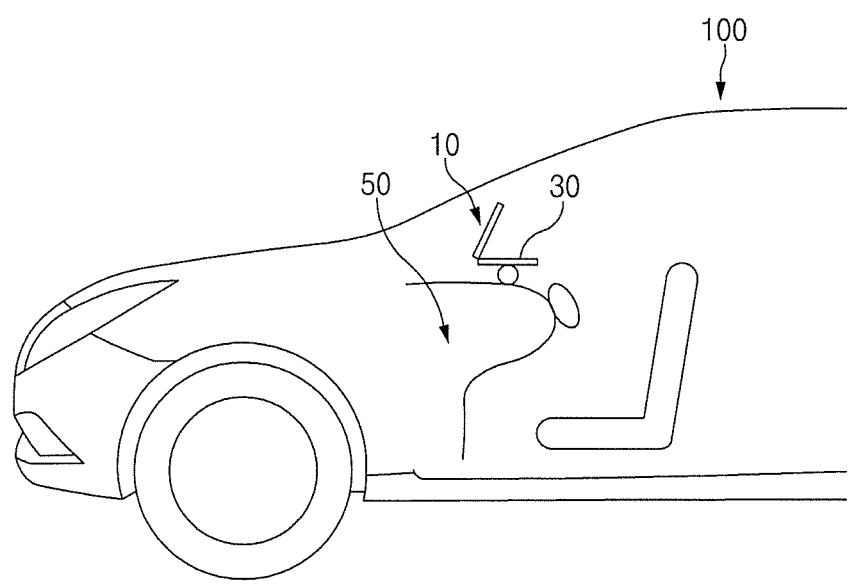
FIG. 1 is a schematic view illustrating a vehicle according to the present disclosure.

Hereinafter, exemplary embodiments of the present disclosure will be described in detail with reference to the accompanying drawings. It should be understood that even if shown in different drawings, identical elements are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a schematic view illustrating a vehicle 100 according to an exemplary embodiment of the present disclosure.

Referring to FIG. 1, the vehicle 100 may include a head-up display device 10, an electronic device 30, and a vehicle system 50.

The head-up display device 10 may be operable in conjunction with the electronic device 30, and the electronic device 30 may be operable in conjunction with the vehicle system 50. The interworking between the components of the vehicle 100 may be constructed via wireless communication or wired communication.

The head-up display device 10, when operating in conjunction with the electronic device 30, may receive a control command from the electronic device 30 and may control an operation of the head-up display device 10.

The electronic device 30 may operate in conjunction with the vehicle system 50 and may receive vehicle information from the vehicle system 50. The electronic device 30 may display the vehicle information received from the vehicle system 50. The interworking between the electronic device 30 and the vehicle system 50 may be constructed for obtaining more accurate data from the vehicle 100. When the electronic device 30 is capable of obtaining sufficient vehicle information with an application therein, the electronic device 30 may not operate in conjunction with the vehicle system 50.

Hereinafter, the components of the vehicle 100 according to the present disclosure will be described in detail with reference to FIGS. 2 to 4.

Figure 2:
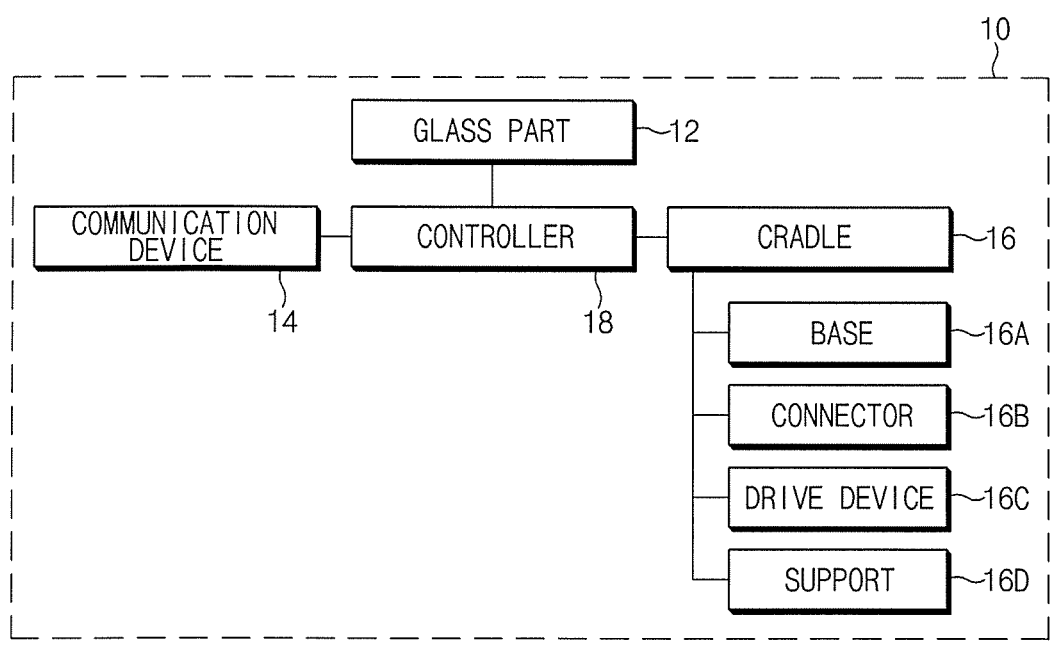
FIGS. 2 to 4 are block diagrams illustrating components of the vehicle according to the present disclosure, respectively.

FIG. 2 is a block diagram illustrating the head-up display device 10 according to the present disclosure.

Referring to FIG. 2, the head-up display device 10 according to the present disclosure may include a glass 12, a communication device 14, a cradle 16, and a controller 18. According to an embodiment, the head-up display device 10 according to the present disclosure may be attached to the top of a crash pad C/PAD similarly to a combiner type head-up display device. Without being limited thereto, however, the head-up display device 10 may be implemented in a detachable form.

The glass 12 may be coupled to the cradle 16 at one side thereof and may be inclined at a predetermined angle with respect to the electronic device 30 placed on the cradle 16. The glass 12 may include a translucent medium layer that reflects a display 34 of the electronic device 30 and transfers vehicle information to a driver. Accordingly, an environment over the glass 12 may transmit through the glass 12.

The glass 12 may be implemented with translucent glass, and therefore, the driver's face may be reflected in the glass 12. According to an embodiment, the driver's eyes may be reflected in the glass 12.

The communication device 14 is a hardware device and may be operable in conjunction with a communication device 32 of the electronic device 30 via communication. According to an embodiment, the communication device 14 may receive a control command signal from the communication device 32 of the electronic device 30. The communication device 14 may receive a control command generated based on an image of the glass 12 taken with a camera 36 of the electronic device 30. In addition, the communication device 14 communicates with the communication device 32 by using the wireless Internet, the short range communication, and/or mobile communication.

The control command may be generated based on an image of the driver's eyes reflected in the glass 12. The control command may include a control command to adjust the tilt of the cradle 16 such that the reflection position of the driver's eyes is formed in a predetermined region of an image taken with the camera 36 of the electronic device 30. The predetermined region will be described below with reference to FIG. 7.

More specifically, the control command may include a first control command generated when the reflection position of the driver's eyes is formed in the predetermined region of the image taken with the camera 36 of the electronic device 30, a second control command generated when the reflection position of the driver's eyes is formed above the predetermined region of the image taken with the camera 36 of the electronic device 30, and a third control command generated when the reflection position of the driver's eyes is formed below the predetermined region of the image taken with the camera 36 of the electronic device 30.

The cradle 16 may be used to support the electronic device 30. The cradle 16 may be detachably mounted on an attachment surface of the vehicle 100 and may be implemented to adjust the tilt thereof. The attachment surface of the vehicle 100 may include the crash pad C/PAD.

The tilt of the cradle 16 may be set such that the cradle 16 is parallel to the attachment surface of the vehicle 100. The tilt of the cradle 16 may be adjusted by slanting the cradle 16 in a direction toward or facing away from the driver according to a control command.

According to an embodiment, the cradle 16 may include a base 16A attached to or detached from the crash pad C/PAD of the vehicle 100, a tilt-adjustable connector 16B coupled to the top of the base 16A, a drive device 16C for adjusting the tilt of the connector 16B, and a support 16D coupled to the top of the connector 16B to support the electronic device 30. The tilt of the support 16D may be adjusted by the connector 16B.

The base 16A may be secured to the attachment surface of the vehicle 100. Alternatively, the base 16A may be detachably mounted on the attachment surface of the vehicle 100, instead of being secured thereto. Assuming that the support 16D forms an angle of 0 degrees with the attachment surface of the vehicle 100 when the support 16D is parallel to the attachment surface of the vehicle 100, the drive device 16C may slant the support 16D in a direction toward or facing away from the driver to allow the support 16D to form a maximum of 45 degrees with the attachment surface of the vehicle 100. The drive device 16C may be implemented with a stepping motor to adjust the tilt of the connector 16B. The support 16D may be coupled to the glass 12 to maintain the predetermined angle with the glass 12.

The controller 18 may determine whether the electronic device 30 is placed on the cradle 16. When the electronic device 30 is placed on the cradle 16, the controller 18 may allow the electronic device 30 and the head-up display device 10 to operate in conjunction with each other. The controller 18 may receive a control command from the electronic device 30, with the head-up display device 10 operating in conjunction with the electronic device 30.

The controller 18 may adjust the tilt of the cradle 16 according to the control command received from the electronic device 30. The tilt of the glass 12, which is coupled to the cradle 16 at the predetermined angle, may also be adjusted together during the adjustment of the tilt of the cradle 16, which enables the driver to easily gaze at the glass 12.

When the communication device 14 receives the first control command from the electronic device 30, the controller 18 may maintain the tilt of the cradle 16 without change. According to an embodiment, the controller 18 may control the drive device 16C to adjust the tilt of the support 16D such that the support 16D and the attachment surface of the vehicle 100 are parallel to each other. A more specific description thereabout will be given below with reference to FIGS. 8A and 8B.

When the communication device 14 receives the second control command from the electronic device 30, the controller 18 may adjust the tilt of the cradle 16 such that the cradle 16 is slanted in a direction facing away from the driver. According to an embodiment, the controller 18 may slant the support 16D up to 45 degrees in the direction facing away from the driver to allow the support 16D to form a maximum of 45 degrees with the attachment surface of the vehicle 100. A more specific description thereabout will be given below with reference to FIGS. 9A and 9B.

When the communication device 14 receives the third control command from the electronic device 30, the controller 18 may adjust the tilt of the cradle 16 such that the cradle 16 is slanted in a direction toward the driver. According to an embodiment, the controller 18 may slant the support 16D up to 45 degrees in the direction toward the driver to allow the support 16D to form a maximum of 45 degrees with the attachment surface of the vehicle 100. A more specific description thereabout will be given below with reference to FIGS. 10A and 10B.

Figure 3:
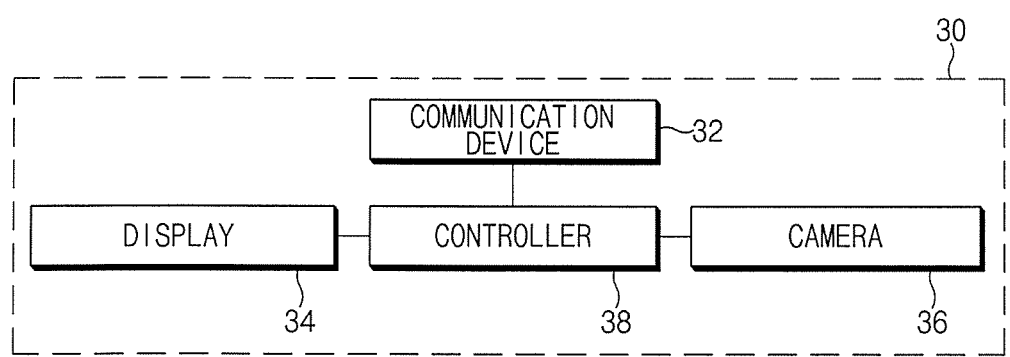

FIG. 3 is a block diagram illustrating the electronic device 30.

The electronic device 30 may include the communication device 32, the display 34, the camera 36, and a controller 38. Here, the electronic device 30 may include a portable terminal. According to an embodiment, the electronic device 30 may include a mobile phone, a personal digital assistant (PDA), or a notebook computer.

The communication device 32 of the electronic device 30 may communicate with the communication device 14 and a vehicle communication device 54 to allow the electronic device 30 to operate in conjunction with the head-up display device 10 and the vehicle 100. The communication device 32 may transmit a control command generated by the electronic device 30 to the communication device 14. In addition, the communication device 32 may receive vehicle information from the vehicle 100. Similar to the communication device 14, the communication device 32 and the vehicle communication device 54 are hardware devices.

The display 34 of the electronic device 30 may output images for information received from a vehicle navigation system 52 and a vehicle travel data diagnostics device 56 when the electronic device 30 operates in conjunction with the vehicle system 50. According to an embodiment, the display 34 may output navigation information and turn by turn (TBT) information and may display an image that is the same as an image output from a vehicle display (not illustrated). To achieve this, the display 34 may be implemented with an LCD or an OLED.

The display 34 may output images for information on the position of the vehicle 100 and information on directions by using a vehicle information application installed in the electronic device 30.

The camera 36 may capture an image that the glass 12 produces by reflection. More specifically, the camera 36 may take an image of at least one eye of the driver reflected in the glass 12.

The controller 38 may generate a control command based on the image taken with the camera 36 and may transmit the control command to the communication device 14.

The controller 38 may generate a control command based on an image of the glass 12 taken with the camera 36. More specifically, the controller 38 may generate a control command based on an image of the driver's eyes reflected in the glass 12, the image being taken with the camera 36, and the control command may include a control command to adjust the tilt of the cradle 16 such that the reflection position of the driver's eyes is formed in a predetermined region of the image taken with the camera 36 of the electronic device 30.

According to an embodiment, the controller 38 may generate the first control command when the reflection position of the driver's eyes is formed in the predetermined region of the image taken with the camera 36 of the electronic device 30, the second control command when the reflection position of the driver's eyes is formed above the predetermined region of the image taken with the camera 36 of the electronic device 30, and the third control command when the reflection position of the driver's eyes is formed below the predetermined region of the image taken with the camera 36 of the electronic device 30.

According to an embodiment, when generating the first control command, the controller 38 may determine that the driver gazes at the glass 12 normally, and when generating the second or third control command, the controller 38 may determine that the driver cannot gaze at the glass 12 normally.

Therefore, the first control command may include a control command to maintain the tilt of the cradle 16 of the head-up display device 10. The second control command or the third control command may include a control command to adjust the tilt of the cradle 16 of the head-up display device 10 such that the cradle 16 is slanted in a direction toward or facing away from the driver. In the present disclosure, the tilt of the cradle 16 may be adjusted according to the control commands, which enables the driver to gaze at the glass 12 normally.

The controller 38 may operate an application in the electronic device 30 to provide information on directions, information on the position of the vehicle 100, and information on the speed of the vehicle 100 and may output the information via the display 34.

In order to provide more accurate vehicle information, the controller 38 may operate in conjunction with the vehicle 100, receive vehicle information from the vehicle 100, and output the vehicle information via the display 34.

Figure 4:
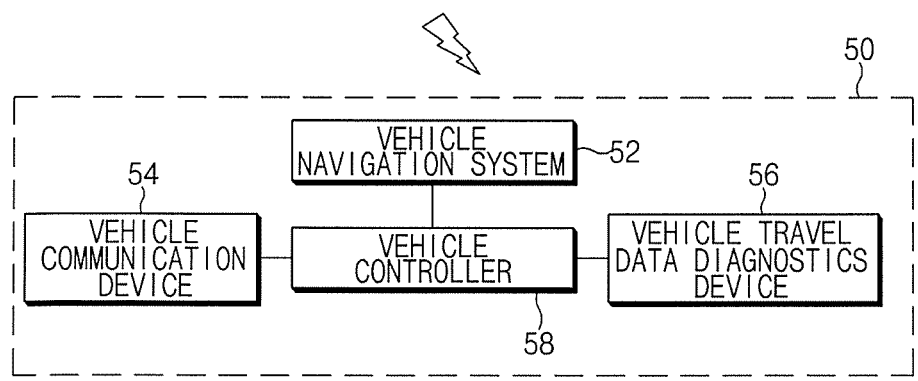

FIG. 4 is a block diagram illustrating the vehicle system 50.

The vehicle system 50 may include the vehicle navigation system 52, the vehicle communication device 54, the vehicle travel data diagnostics device 56, and a vehicle controller 58.

The vehicle navigation system 52 is an electronic system and may guide a path from a current position to a predetermined destination and may output a map and the guide path together as images.

The vehicle communication device 54 may be operable in conjunction with the communication device 32 of the electronic device 30 via communication. The vehicle communication device 54 may transmit vehicle information to the communication device 32. According to an embodiment, the vehicle communication device 54 may include an on board diagnostics (OBD) port. The vehicle communication device 54 may transmit signals for information about the vehicle navigation system 52 and the vehicle travel data diagnostics device 56 to the communication device 32.

The vehicle travel data diagnostics device 56 may include an on board diagnostics (OBD) terminal. The OBD terminal may perform on board diagnostics (OBD) on the vehicle 100 based on information on main systems of the vehicle 100 or information on failures that is transferred to the vehicle controller 58 from a payload, that is, a sensor, attached to the vehicle 100. The information transferred to the vehicle controller 58 may include time, distance, speed, revolutions per minute (RPM), fuel economy, battery voltage, coolant exchange, and idle time.

The vehicle controller 58 may transmit the vehicle information to the communication device 32 when the vehicle system 50 operates in conjunction with the electronic device 30.

Figure 5:
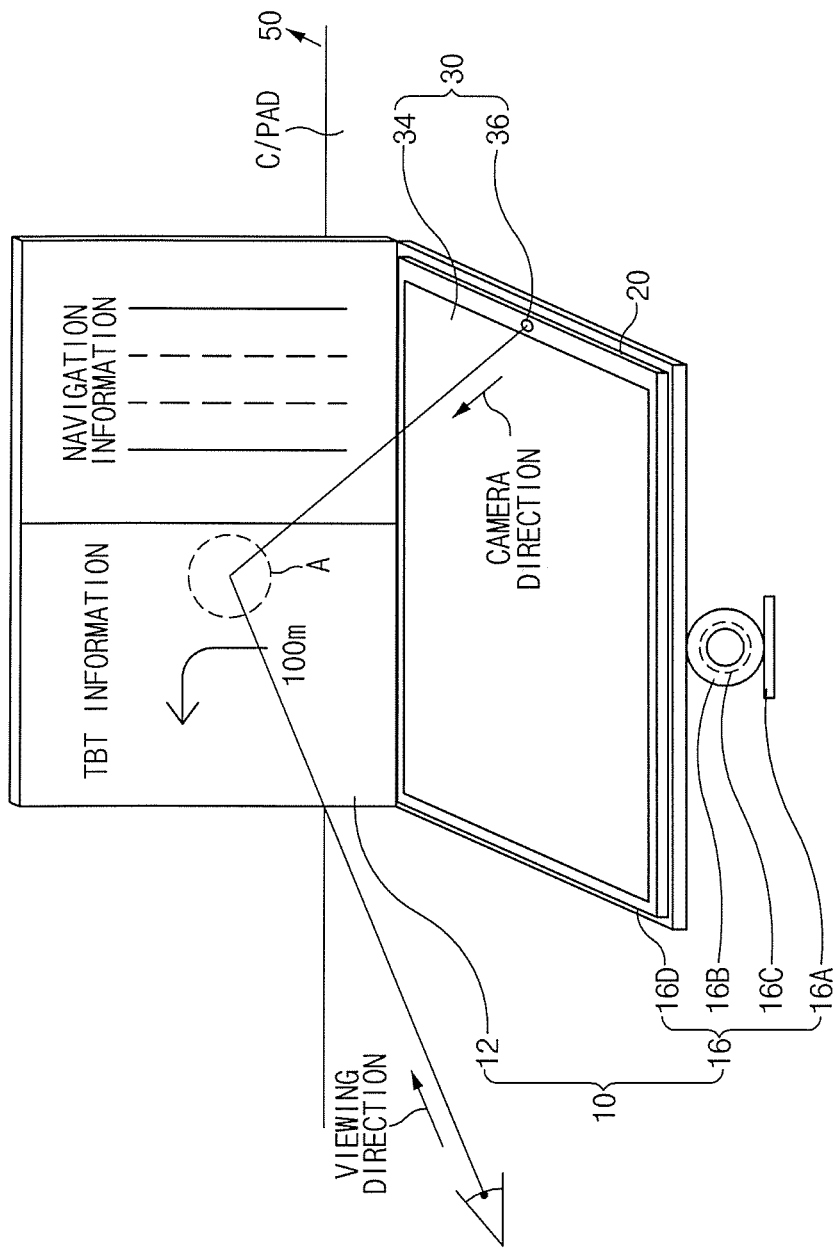
FIG. 5 is a view illustrating a head-up display device having an electronic device placed thereon according to an exemplary embodiment of the present disclosure.

FIG. 5 is a view illustrating the head-up display device 10 having the electronic device 30 placed thereon according to an exemplary embodiment of the present disclosure.

Referring to FIG. 5, the head-up display device 10 may include the glass 12 and the cradle 16. The cradle 16 may include the base 16A, the connector 16B, the drive device 16C, and the support 16D.

The glass 12 may be inclined at the predetermined angle with respect to the support 16D. The glass 12 may redirect an image output from the electronic device 30. The image redirected by the glass 12 may be transferred to the driver.

The electronic device 30 may be placed on the support 16D. The electronic device 30 may include the display 34 and the camera 36. The camera 36 may capture an image that the glass 12 produces by reflection, and may take an image of at least one eye of the driver reflected in at least the glass 12. According to an embodiment, assuming that "A" denotes the position of the driver's eyes reflected in the glass 12, the camera 36 may take an image including "A".

The controller 18 may adjust the tilt of the cradle 16 according to a control command received from the electronic device 30. More specifically, the controller 18 may control the drive device 16C according to the control command received from the electronic device 30 to adjust the angle that the support 16D forms with the attachment surface of the vehicle 100.

Figure 6:
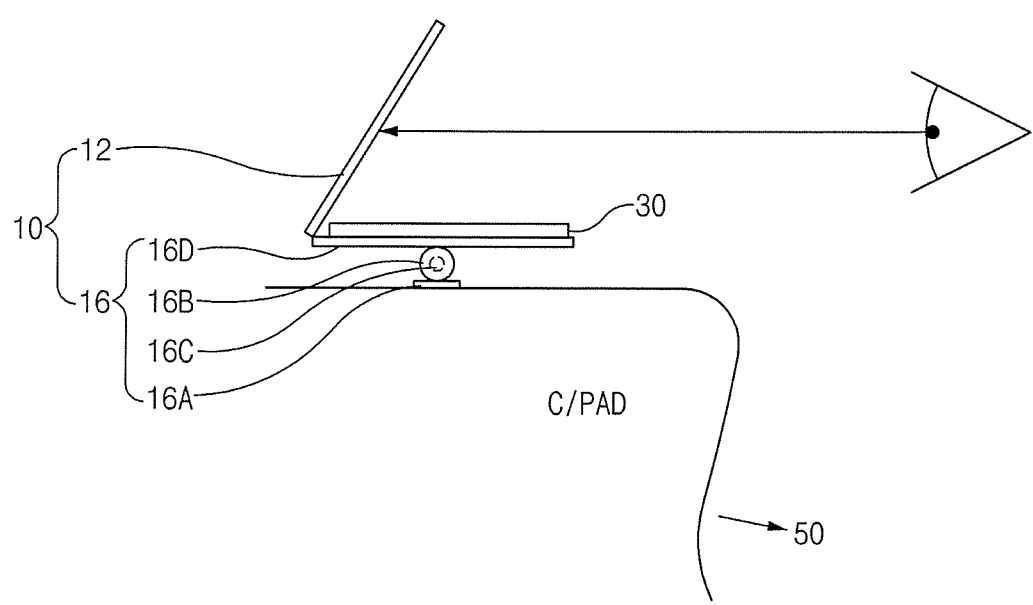
FIG. 6 is a left side view illustrating the head-up display device according to an exemplary embodiment of the present disclosure.

FIG. 6 is a left side view illustrating the head-up display device 10 according to an exemplary embodiment embodiment of the present disclosure.

Referring to FIG. 6, the base 16A may be secured to the attachment surface of the vehicle 100. Alternatively, the base 16A may be detachably mounted on the attachment surface of the vehicle 100, instead of being secured thereto. Assuming that the support 16D forms an angle of 0 degrees with the attachment surface of the vehicle 100 when the support 16D is parallel to the attachment surface of the vehicle 100, the drive device 16C may adjust the tilt of the cradle 16 in the clockwise or counterclockwise direction to allow the support 16D to form a maximum of 45 degrees with the attachment surface of the vehicle 100. The clockwise direction may refer to a direction toward the driver, and the counterclockwise direction may refer to a direction facing away from the driver.

Figure 7:
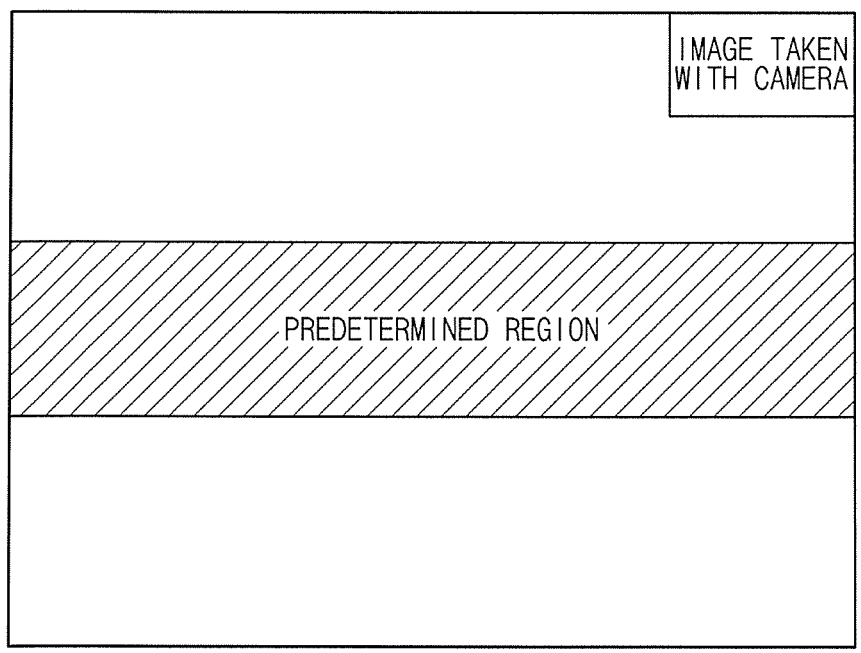
FIG. 7 is a view illustrating a predetermined region of an image taken with a camera of the electronic device.

FIG. 7 is a view illustrating a predetermined region of an image taken with the camera 36 of the electronic device 30.

Referring to FIG. 7, the predetermined region of the image taken with the camera 36 of the electronic device 30 may be understood as a normal region where the reflection position of the driver's eyes has to be obtained. The predetermined region may include a central portion of the image taken with the camera 36. According to an embodiment, the central portion of the image taken with the camera 36 may refer to a region between 45% and 55% of the vertical pixel count with respect to the bottom of the image taken with the camera 36. For example, when the entire image taken with the camera 36 has 1600×900 pixels, the predetermined region of the image taken with the camera 36 may refer to a region between a vertical pixel value of 405 and a vertical pixel value of 495.

Figure 8B:
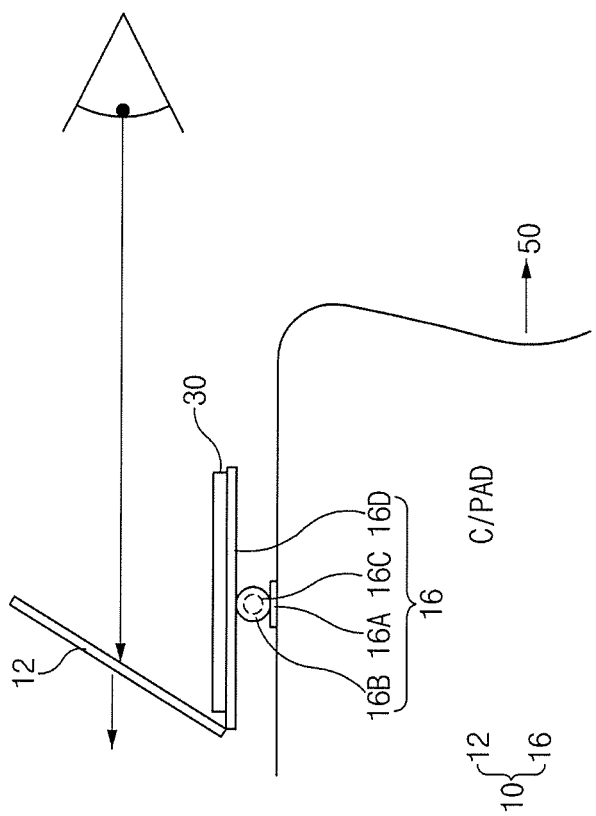
FIG. 8B is a view illustrating an operation in which the head-up display device is controlled when the first control command is received.
Figure 8A:
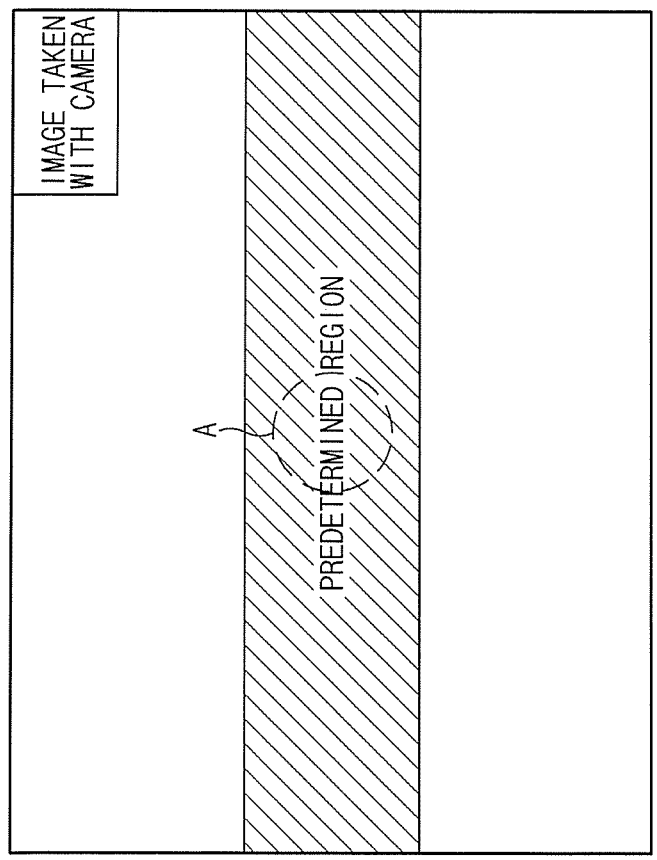
FIG. 8A is a view illustrating an image taken with the camera of the electronic device when a first control command is generated.

FIG. 8A is a view illustrating an image taken with the camera 36 of the electronic device 30 when the first control command is generated, and FIG. 8B is a view illustrating an operation in which the head-up display device 10 is controlled when the first control command is received.

When the controller 38 determines that the reflection position "A" of the driver's eyes is formed in a predetermined region of the image taken with the camera 36 of the electronic device 30, as illustrated in FIG. 8A, the controller 38 may determine that the driver can gaze at the glass 12 normally. Therefore, the controller 38 may generate the first control command to maintain the tilt of the cradle 16 of the head-up display device 10 without change.

When the communication device 14 receives the first control command, the controller 18 may control the drive device 16C to maintain the tilt of the cradle 16 such that the support 16D is parallel to the attachment surface of the vehicle 100 as illustrated in FIG. 8B.

Figure 9B:
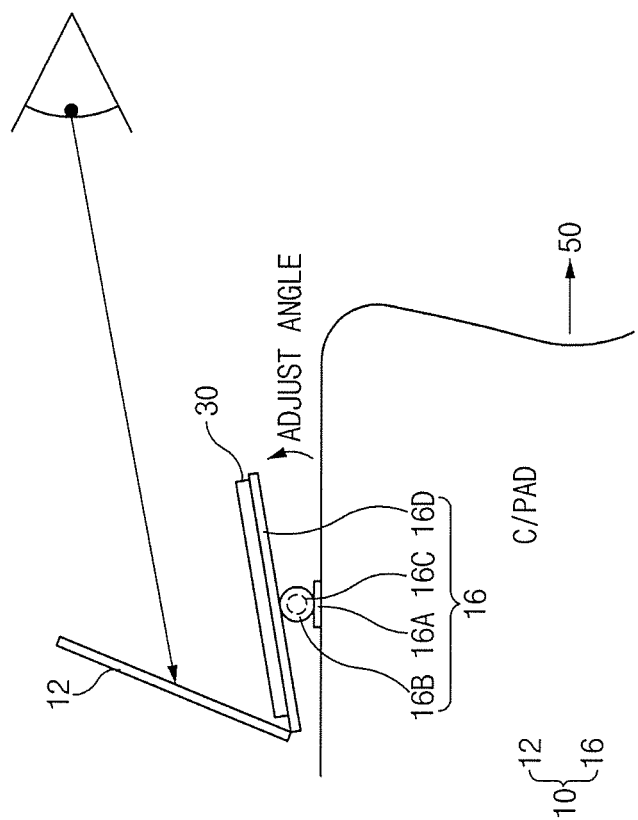
FIG. 9B is a view illustrating an operation in which the head-up display device is controlled when the second control command is received.
Figure 9A:
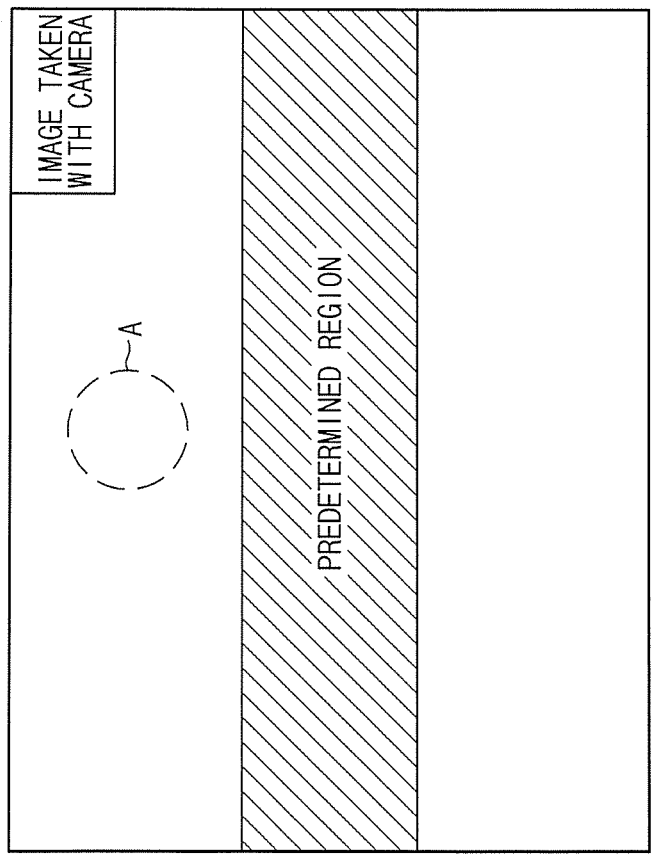
FIG. 9A is a view illustrating an image taken with the camera of the electronic device when a second control command is generated.

FIG. 9A is a view illustrating an image taken with the camera 36 of the electronic device 30 when the second control command is generated, and FIG. 9B is a view illustrating an operation in which the head-up display device 10 is controlled when the second control command is received.

When the controller 38 determines that the reflection position "A" of the driver's eyes is formed above a predetermined region of the image taken with the camera 36 of the electronic device 30, as illustrated in FIG. 9A, the controller 38 may determine that the driver cannot gaze at the glass 12 normally. Therefore, the controller 38 may generate the second control command to adjust the tilt of the cradle 16 of the head-up display device 10.

When the communication device 14 receives the second control command, the controller 18 may control the drive device 16C to slant the cradle 16 in a direction facing away from the driver as illustrated in FIG. 9B. Accordingly, the driver can gaze at the glass 12 normally.

Figure 10B:
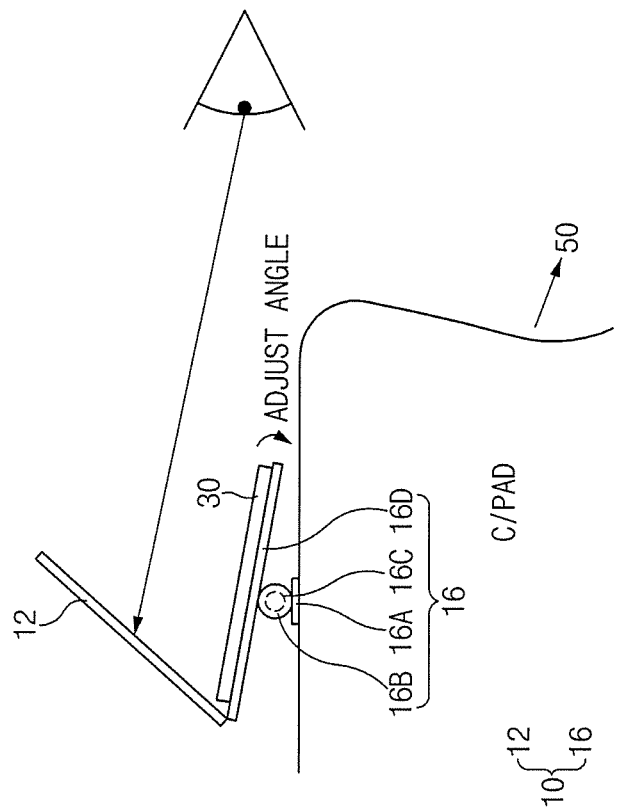
FIG. 10B is a view illustrating an operation in which the head-up display device is controlled when the third control command is received.
Figure 10A:
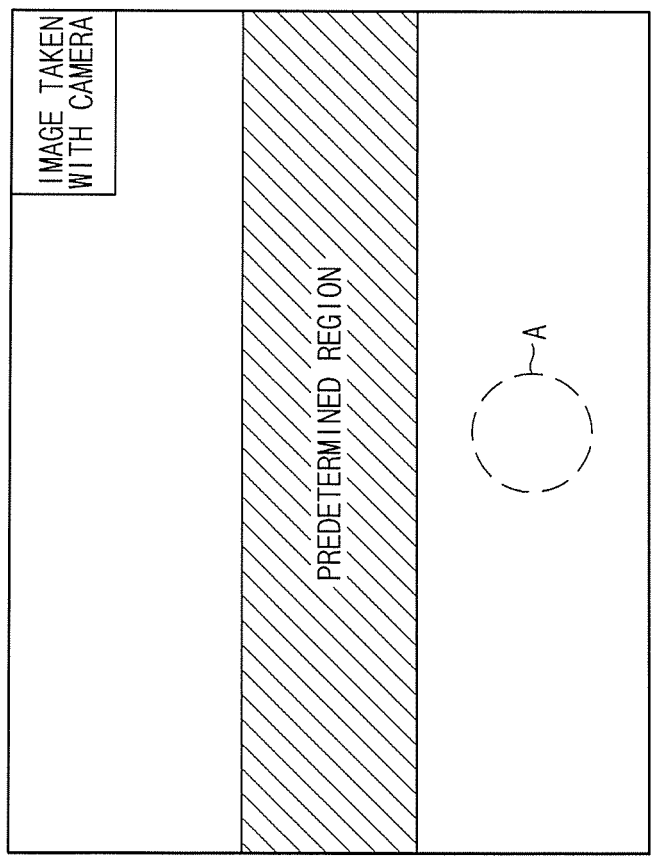
FIG. 10A is a view illustrating an image taken with the camera of the electronic device when a third control command is generated.

FIG. 10A is a view illustrating an image taken with the camera 36 of the electronic device 30 when the third control command is generated, and FIG. 10B is a view illustrating an operation in which the head-up display device 10 is controlled when the third control command is received.

When the controller 38 determines that the reflection position "A" of the driver's eyes is formed below a predetermined region of the image taken with the camera 36 of the electronic device 30, as illustrated in FIG. 10A, the controller 38 may determine that the driver cannot gaze at the glass 12 normally. Therefore, the controller 38 may generate the third control command to adjust the tilt of the cradle 16 of the head-up display device 10.

When the communication device 14 receives the third control command, the controller 18 may control the drive device 16C to slant the cradle 16 in a direction toward the driver as illustrated in FIG. 10B. Accordingly, the driver can gaze at the glass 12 normally.

Figure 11:
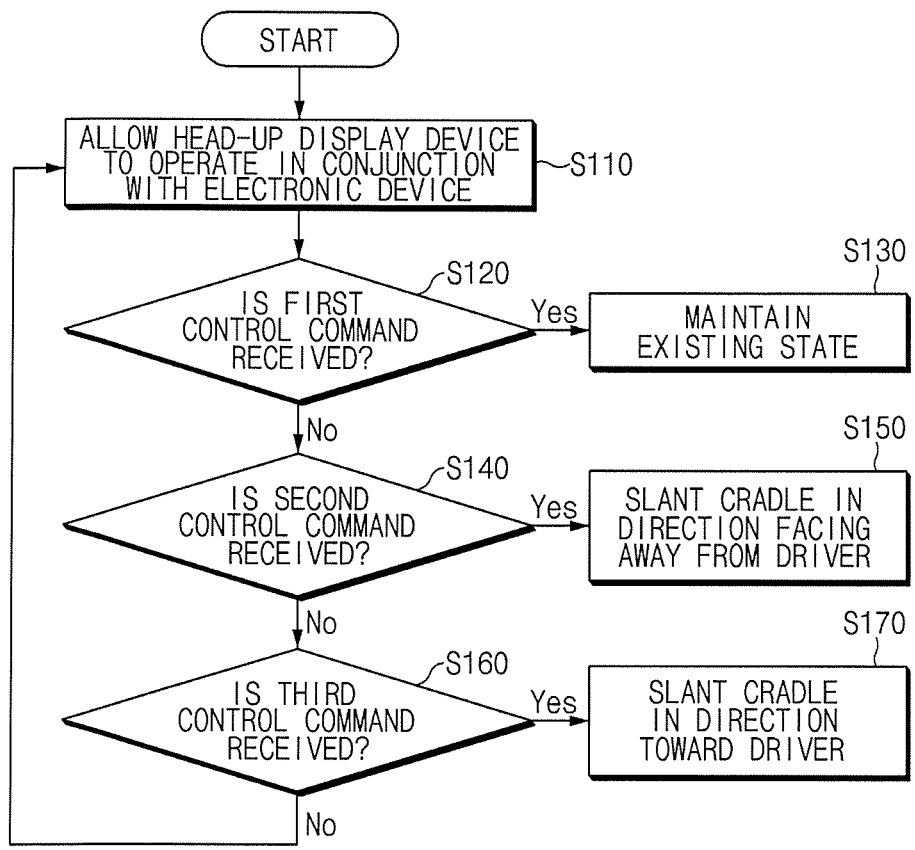
FIG. 11 is a flowchart illustrating a method for controlling the head-up display device according to an exemplary embodiment of the present disclosure.

FIG. 11 is a flowchart illustrating a method for controlling the head-up display device 10 according to the present disclosure.

Referring to FIG. 11, the controller 18 may allow the head-up display device 10 to operate in conjunction with the electronic device 30 (Step S110). In step S110, the controller 18 may determine whether the electronic device 30 is placed on the cradle 16 of the head-up display device 10. When the electronic device 30 is placed on the cradle 16, the head-up display device 10 may be allowed to operate in conjunction with the electronic device 30.

Thereafter, the controller 18 may determine whether the first control command is received from the electronic device 30 (Step S120).

When it is determined in step S120 that the first control command is received (Yes), the controller 18 may maintain the tilt of the cradle 16 (Step S130). When it is determined in step S120 that the first control command is not received (No), the controller 18 may determine whether the second control command is received (Step S140).

When it is determined in step S140 that the second control command is received (Yes), the controller 18 may adjust the tilt of the cradle 16 in a direction facing away from the driver (Step S150). When the tilt of the cradle 16 is adjusted in the direction facing away from the driver in step S150, the tilt of the glass 12 coupled to the cradle 16 at the predetermined angle may also be adjusted, which enables the driver to gaze at the glass 12 normally.

When it is determined in step S140 that the second control command is not received (No), the controller 18 may determine whether the third control command is received (Step S160). When it is determined in step S160 that the third control command is received (Yes), the controller 18 may adjust the tilt of the cradle 16 in a direction toward the driver (Step S170). When the tilt of the cradle 16 is adjusted in the direction toward the driver in step S170, the tilt of the glass 12 coupled to the cradle 16 at the predetermined angle may also be adjusted, which enables the driver to gaze at the glass 12 normally.

Figure 12:
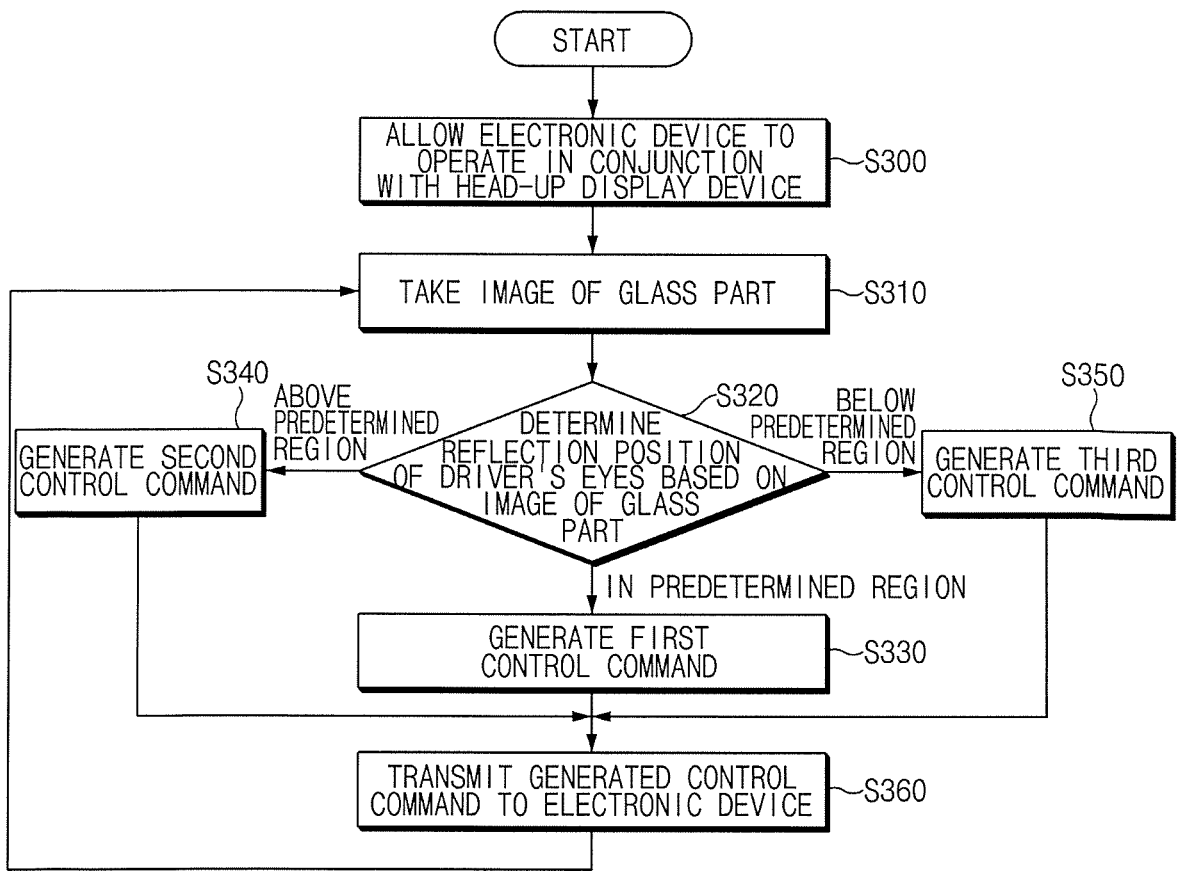
FIG. 12 is a flowchart illustrating a method for controlling the electronic device that operates in conjunction with the head-up display device according to an exemplary embodiment of the present disclosure.

FIG. 12 is a flowchart illustrating a method for controlling the electronic device 30 that operates in conjunction with the head-up display device 10 according to the present disclosure.

Referring to FIG. 12, the controller 38 of the electronic device 30 may allow the electronic device 30 to operate in conjunction with the head-up display device 10 (Step S300).

In step S300, the controller 38 of the electronic device 30 may determine whether the electronic device 30 is placed on the cradle 16 of the head-up display device 10. When the electronic device 30 is placed on the cradle 16, the electronic device 30 may be allowed to operate in conjunction with the head-up display device 10.

The camera 36 of the electronic device 30 may photograph the head-up display device 10 (Step S310). In step S310, the camera 36 of the electronic device 30 may take an image of the glass 12 of the head-up display device 10. More preferably, the camera 36 may capture an image that the glass 12 produces by reflection. Specifically, the camera 36 of the electronic device 30 may take an image of at least one eye of the driver reflected in the glass 12.

The controller 38 of the electronic device 30 may determine the reflection position of the driver's eyes based on the image of the head-up display device 10.

The controller 38 may generate the first control command (Step S330) when it is determined in step S320 that the reflection position of the driver's eyes is formed in a predetermined region of the image taken with the camera 36.

The controller 38 may generate the second control command (Step S340) when it is determined in step S320 that the reflection position of the driver's eyes is formed above the predetermined region of the image taken with the camera 36.

The controller 38 may generate the third control command (Step S350) when it is determined in step S320 that the reflection position of the driver's eyes is formed below the predetermined region of the image taken with the camera 36.

The controller 38 may transmit the generated control command to the head-up display device 10. The controller 38 may perform step S310 again after step S360. The reason for performing step S310 again is for continually determining the reflection position of the driver's eyes reflected in the glass 12 even after the generation of the control command.

Figure 13:
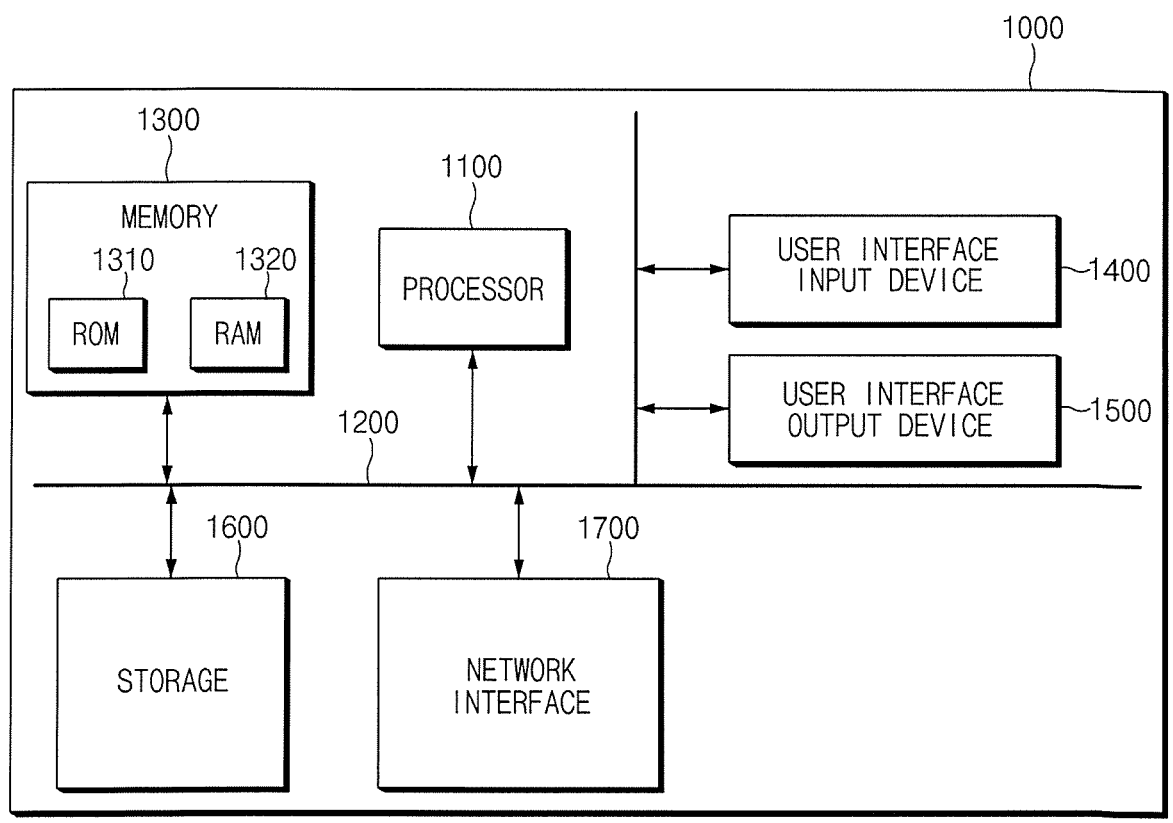
FIG. 13 is a block diagram illustrating a computing system that executes a method according to an exemplary embodiment of the present disclosure.

FIG. 13 is a block diagram illustrating a computing system 1000 that executes a method according to an exemplary embodiment of the present disclosure.

Referring to FIG. 13, the computing system 1000 may include at least one processor 1100, memory 1300, a user interface input device 1400, a user interface output device 1500, storage 1600, and a network interface 1700 that are coupled together through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) and a random access memory (RAM).

Accordingly, the steps of the methods or algorithms described above in relation to the embodiments disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the present disclosure, the position of a driver's eyes is recognized based on the camera included in the electronic device, and therefore a separate camera does not need to be mounted in the vehicle, whereby cost savings can be achieved.

Furthermore, since a package space inside the crash pad is not required to install the head-up display device, the head-up display device is also applicable to compact cars.

In addition, even though the position of the driver's eyes is shifted according to the driver's posture change, or a new driver sits in the driver's seat, the cradle is controlled based on the position of the driver's eyes, so that the driver can easily gaze at the screen of the glass.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:
1. A head-up display device comprising:
a cradle on which an electronic device is placed;
a glass in which an image, which is output from the electronic device, is reflected; and
a controller configured to receive a control command from the electronic device and further configured to adjust a tilt of the cradle according to the control command received from the electronic device, wherein the control command is generated based on an image of the glass taken with a camera of the electronic device.

2. The head-up display device of claim 1, wherein the cradle includes:
   a base detachably mounted on an attachment surface of a vehicle;
   a tilt-adjustable connector coupled to a top of the base;
   a drive device configured to adjust a tilt of the connector; and
   a support coupled to a top of the connector, wherein a tilt of the support relative to the vehicle is adjusted by the adjustment of the tilt of the connector.

3. The head-up display device of claim 1, wherein the control command includes a tilt control command to adjust the tilt of the cradle such that a reflection position of driver's eyes is in a predetermined region of the image taken with a camera of the electronic device.

4. The head-up display device of claim 3, wherein the predetermined region is a central portion of the image taken with the camera of the electronic device.

5. The head-up display device of claim 3, wherein the control command includes at least one of:
   a first control command generated when the reflection position of the driver's eyes is located in the predetermined region of the image taken with the camera of the electronic device;
   a second control command generated when the reflection position of the driver's eyes is located above the predetermined region of the image taken with the camera of the electronic device; and
   a third control command generated when the reflection position of the driver's eyes is located below the predetermined region of the image taken with the camera of the electronic device.

6. The head-up display device of claim 5, wherein upon the receipt of the first control command, the controller maintains the tilt of the cradle.

7. The head-up display device of claim 5, wherein upon the receipt of the second control command, the controller adjusts the tilt of the cradle such that the cradle is slanted in a direction facing away from a driver.

8. The head-up display device of claim 5, wherein upon the receipt of the third control command, the controller adjusts the tilt of the cradle such that the cradle is slanted in a direction toward a driver.

9. The head-up display device of claim 1, wherein the controller continually receives control commands of the electronic device after receiving the control command of the electronic device and adjusting the tilt of the cradle.

10. A vehicle comprising a head-up display device and an electronic device, wherein the head-up display device includes: a cradle on which the electronic device is placed;
   a glass in which an image, which is output from the electronic device, is reflected; and
   a first controller configured to receive a control command from the electronic device and further configured to adjust a tilt of the cradle according to the control command received from the electronic device, and
   wherein the electronic device includes:
   a camera configured to take an image of the glass of the head-up display device; and
   a second controller configured to determine a reflection position of a driver's eyes based on the image of the glass and configured to generate the control command to adjust the tilt of the cradle of the head-up display device,
   wherein the control command is generated based on an image of the glass taken with the camera of the electronic device.

11. A method for controlling a head-up display device, the method comprising steps of:
   allowing, by a controller, the head-up display device to operate in conjunction with an electronic device;
   receiving, by the controller, a control command from the electronic device when the head-up display device operates in conjunction with the electronic device; and
   adjusting, by the controller, a tilt of a cradle on which the electronic device is placed, according to the control command received from the electronic device,
   wherein the control command is generated based on an image of the glass of the head-up display device that is taken with a camera of the electronic device.

12. The method of claim 11, wherein the step of receiving the control command includes:
   receiving a control command to adjust the tilt of the cradle such that a reflection position of driver's eyes is located in a predetermined region of an image of a glass of the head-up display device that is taken with a camera of the electronic device.

13. The method of claim 12, wherein the predetermined region is a central portion of the image taken with the camera of the electronic device.

14. The method of claim 11, wherein the step of receiving the control command includes at least one of:
   receiving a first control command generated when a reflection position of a driver's eyes is located in a predetermined region of an image taken with a camera of the electronic device;
   receiving a second control command generated when the reflection position of the driver's eyes is located above the predetermined region of the image taken with the camera of the electronic device; and
   receiving a third control command generated when the reflection position of the driver's eyes is located below the predetermined region of the image taken with the camera of the electronic device.

15. The method of claim 14, wherein the step of adjusting the tilt of the cradle according to the control command received includes: upon the receipt of the first control command, maintaining the tilt of the cradle.

16. The method of claim 14, wherein the step of adjusting the tilt of the cradle according to the control command received includes:
   upon the receipt of the second control command, adjusting the tilt of the cradle such that the cradle is slanted in a direction facing away from a driver.

17. The method of claim 14, wherein the step of adjusting the tilt of the cradle according to the control command received includes:
   upon the receipt of the third control command, adjusting the tilt of the cradle such that the cradle is slanted in a direction toward a driver.

18. The method of claim 14, further comprising:
   continually receiving control commands to adjust the tilt of the cradle after the adjusting of the tilt of the cradle according to the control command received.

* * * * *